United States Patent [19]

Kobayashi et al.

[11] Patent Number: 5,561,659
[45] Date of Patent: *Oct. 1, 1996

[54] OPTICAL INFORMATION RECORDING MEDIUM

[75] Inventors: Setsuo Kobayashi, Hitachi; Kishiro Iwasaki, Hitachiota; Mariko Nakamura, Kawasaki; Hiroshi Sasaki, Ibaraki; Yutaka Ito, Takahagi, all of Japan

[73] Assignee: Hitachi, Ltd., Tokyo, Japan

[*] Notice: The term of this patent shall not extend beyond the expiration date of Pat. No. 5,281,512.

[21] Appl. No.: 450,136

[22] Filed: May 26, 1995

Related U.S. Application Data

[62] Division of Ser. No. 172,169, Dec. 23, 1993, abandoned, which is a division of Ser. No. 574,069, Aug. 29, 1990, Pat. No. 5,281,512.

[30] Foreign Application Priority Data

Aug. 30, 1989 [JP] Japan ..... 1-221817
Dec. 2, 1989 [JP] Japan ..... 1-314065
Apr. 27, 1990 [JP] Japan ..... 2-110069

[51] Int. Cl.$^6$ ..... G11B 3/70
[52] U.S. Cl. ..... 369/272; 369/284; 430/270.14; 430/270.17; 430/270.19; 430/945
[58] Field of Search ..... 369/32, 39, 272, 369/284; 358/342; 430/945, 270.14, 270.17, 270.19

[56] References Cited

U.S. PATENT DOCUMENTS

| | | | |
|---|---|---|---|
| 4,412,231 | 10/1983 | Namba et al. | 346/135.1 |
| 4,769,307 | 9/1988 | Ozawa et al. | 430/270 |
| 4,873,131 | 10/1989 | Kashima et al. | 428/64 |
| 4,897,827 | 1/1990 | Raetzer et al. | 369/32 |
| 5,281,512 | 1/1994 | Kobayashi et al. | 430/270 |

*Primary Examiner*—Thorl Chea
*Attorney, Agent, or Firm*—Antonelli, Terry, Stout & Kraus

[57] ABSTRACT

An optical information recording medium comprising a substrate and formed thereon an information recording layer comprising at least two organic dyes having different chemical structures and continuous playback ability of $10^5$ times or more at a playback laser power of 0.5 to 1.5 mW, is excellent in readout light stability (durability) and reflectance.

7 Claims, 5 Drawing Sheets

F I G. 10A
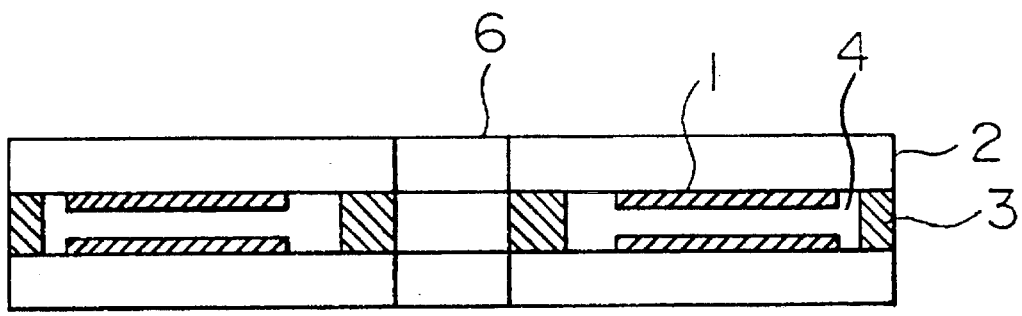
F I G. 10B
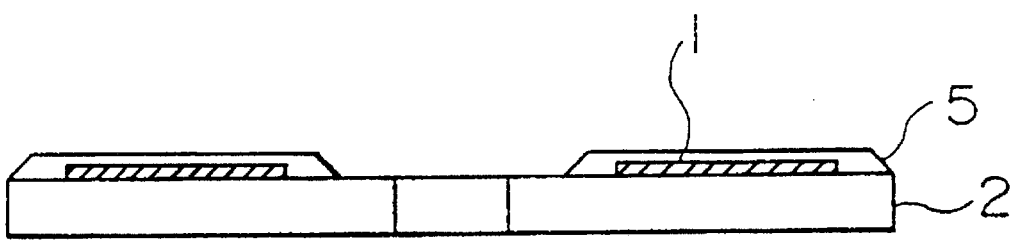

OPTICAL INFORMATION RECORDING MEDIUM

This application is a Divisional application of application Ser. No. 172,169, filed Dec. 23, 1993, now abandoned, which application is a Divisional application of application Ser. No. 574,069, filed Aug. 29, 1990 (now U.S. Pat. No. 5,281,512).

BACKGROUND OF THE INVENTION

This invention relates to an optical information recording medium which can record and read out information by a laser beam, a process for producing the same, a readout (or playback) apparatus for optical information recording media, and a process for reading out information from optical information recording media.

Recently, as means for writing and reading out information in compact discs, video discs, photosensitive members for laser beam printer, optical letter readout machines, etc., optical recording media applying a laser diode beam are practically used. In such optical recording media, a recording medium which absorbs a laser diode beam, that is, near infrared rays, is necessary. As the recording medium, there have been proposed recording media having an inorganic recording layer of tellurium, an alloy of tellurium, an alloy of bismuth, or the like, recording media having an organic dye-containing recording layer such as a phthalocyanine dye (U.S. Pat. No. 4,298,995), a naphthalocyanine dye (Japanese Patent Unexamined Publication No. Heisei 1-198391), etc.

But the optical recording media having an inorganic recording layer have problems in that improvement in productivity is difficult due to employing a process under vacuum such as vacuum deposition, sputtering, etc. for forming a thin film on a substrate, improvement in recording density is limited due to a large thermal conductivity of the recording layer, and tellurium, selenium, and the like are toxic substances requiring careful handling from the viewpoint of safety and health.

On the other hand, the recording media containing organic dyes (organic recording media) are inferior in properties such as durability and reflectance to the recording media having an inorganic recording layer (inorganic recording media). Further, the recording media containing organic dyes are insufficient in both durability and solubility of the dyes in a solvent. But such organic recording media seem to have possibility for overcoming the problems of the inorganic recording media. Thus, organic recording media having the same durability as the inorganic recording media and being able to be produced by spin coating or dip coating have been studied.

For example, there is proposed an optical recording medium having an organic thin film of various derivatives of naphthalocyanines having Al, Ga, In, Te, Si, Ge, Sn, Pb, etc. as a central metal (Japanese Patent Unexamined Publication No. Heisei 1-198391). But such a recording medium is impossible to read out $10^5$ times or more by a semiconductor laser beam at 1 mW of playback readout power.

Therefore, when organic recording media are used, there is produced a system wherein the playback readout power of 0.5 mW or less is used in order to reduce a damage for the organic recording medium layer. But when the playback laser beam of 0.5 mW or less is used, there arise various problems in that outer noises are easily introduced, no interchangeability exists for the apparatus using the playback readout power of 1 mW, and the like.

In order to improve readout light stability of the organic optical recording media, there is proposed an addition of a singlet oxygen quencher to a cyanine dye (Japanese Patent Examined Publication No. Heisei 1-21798). Such a method is effective for preventing the cyanine dye from deterioration by light but not effective for heat energy of laser beam of 1 mW.

SUMMARY OF THE INVENTION

It is an object of the present invention to provide an optical information recording medium excellent in durability and reflectance of an information recording medium layer, and can be produced by spin coating, spray coating or dip coating an organic recording medium layer on a substrate. It is other objects of the present invention to provide a process for producing such an optical information recording medium and applications of such an optical information recording medium.

The present invention provides an optical information recording medium comprising a substrate and an information recording layer formed on the substrate, said information recording layer comprising one or more organic dyes having continuous playback ability of $10^5$ times or more at a playback laser power of 0.5 to 1.5 mW.

The present invention further provides an optical information recording medium comprising a substrate, and an information recording layer formed en the substrate, said information recording layer comprising two or more organic dyes having different chemical structures and continuous readout ability of $10^5$ times or more at a readout laser power of 0.5 to 1.5 mW.

The present invention also provide a process for producing an optical information recording medium, which comprises forming an information recording layer containing two or more organic dyes having different chemical structures and continuous readout ability of $10^5$ times or more at a readout laser power of 0.5 to 1.5 mW on a substrate by spin coating, spray coating or dip coating.

The present invention further provide a playback (or readout) apparatus using such an optical information recording medium, and a readout method using such a readout apparatus.

BRIEF DESCRIPTION OF THE DRAWINGS

FIG. 10 is a cross-sectional view of one example of the optical information recording medium of the present invention.

DESCRIPTION OF THE PREFERRED EMBODIMENTS

Figure 1:
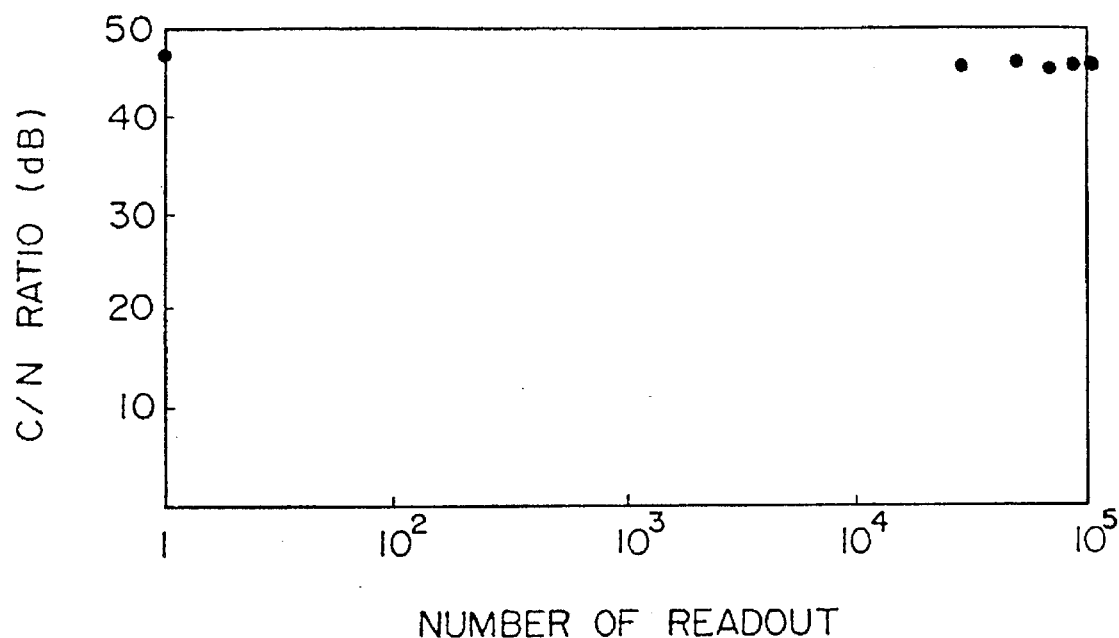
FIG. 1 is a graph showing readout light stability when bis(tributylsiloxy)germanium-tetra(octyloxy)naphthalocyanine and copper tetra-t-butylnaphthalocyanine (5:4 in weight ratio) are used as organic dyes.

The optical information recording medium of the present invention is characterized by having one or more organic dyes in an information recording layer formed on a substrate, said organic dyes having a continuous playback ability of $10^5$ times or more at a playback laser power of 0.5 to 1.5 mW.

Further, said organic dyes preferably have at least two different chemical structures. The expressions "at least two different chemical structures" means that at least one organic dye has a bulky (or top-like) structure wherein large side chains are projected from the central atom, and at least one organic dye has a flat structure.

Thus, the optical information recording medium of the present invention is also characterized by having two or more organic dyes having different chemical structures (i.e. a top-like structure and a flat structure) and continuous readout ability of $10^5$ times or more by a readout laser power of 0.5 to 1.5 mW.

Such organic dyes are preferably a combination of (i) an organic dye having the top-like structure and a pyrolysis beginning temperature (P.B.T.) of 300° C. or lower and selected from derivatives of azaphthalocyanine, phthalocyanine and naphthalocyanine, and (ii) a thermal quencher having the flat structure and a pyrolysis beginning temperature (P.B.T.) of 350° C. or higher and a function for preventing thermal deterioration.

The pyrolysis beginning temperature can be measured by using, for example, a differential scanning thermobalance (e.g., TAS-100 mfd. by Kabushiki Kaisha Rigaku).

The organic dye having a pyrolysis beginning temperature of 300° C. or lower and selected from derivatives of azaphthalocyanine, phthalocyanine and naphthalocyanine can be represented by the formula:

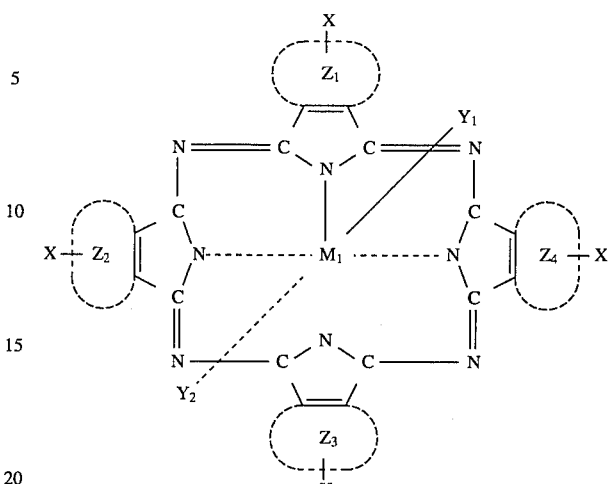

wherein $M_1$ is a metallic atom selected from Si, Ge and Sn belonging to the group IV of the periodic table; $Z_1$, $Z_2$, $Z_3$ and $Z_4$ are independently a pyridine ring, a benzene ring or a naphthalene ring non-substituted or having one or more monovalent substituents —X; X is an alkyl group preferably having 1 to 20 carbon atoms, an alkenyl group preferably having 1 to 20 carbons, an alkylthio group preferably having 1 to 20 carbon atoms, a phenyl group, an acyl group preferably having 2 to 20 carbon atoms or a tri-substituted silyl group; $Y_1$ and $Y_2$ are independently —Ar, —OR, —OAr, —OSi—(R)$_3$, —OSi—(OR)$_3$, —OSi(OAr)$_3$ or —OC(C$_6$H$_5$)$_3$; R is a straight or branched chain alkyl group preferably having 1 to 20 carbon atoms; and Ar is a phenyl group, a substituted phenyl group, a benzyl group or a substituted benzyl group.

Preferable examples of the compound of the formula (I) are as follows.

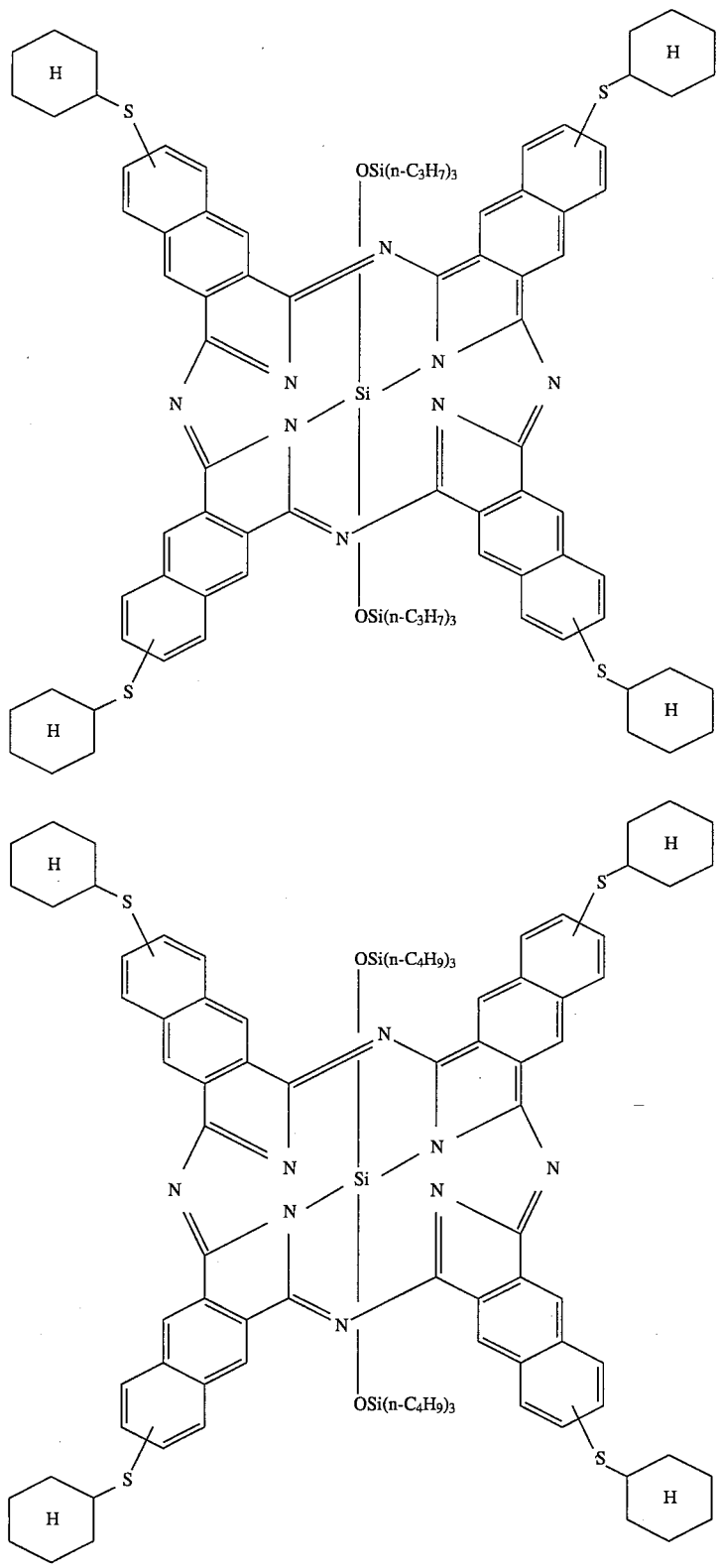

-continued
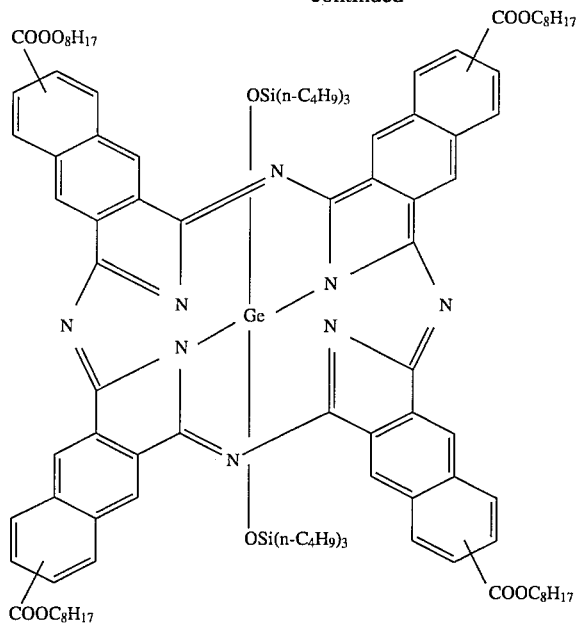
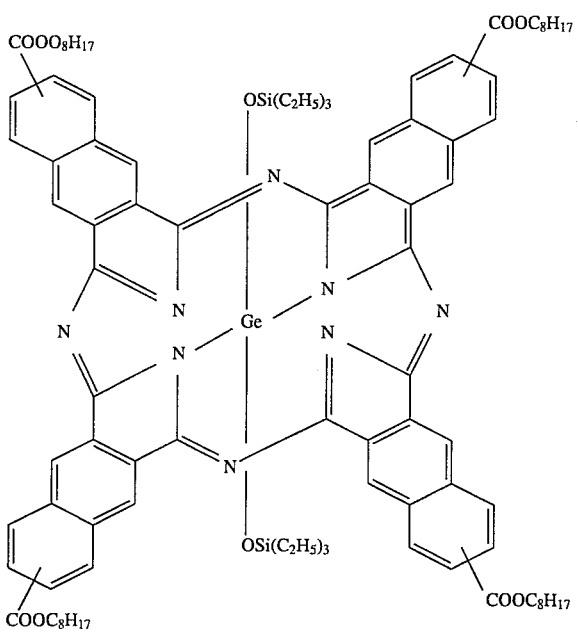

-continued
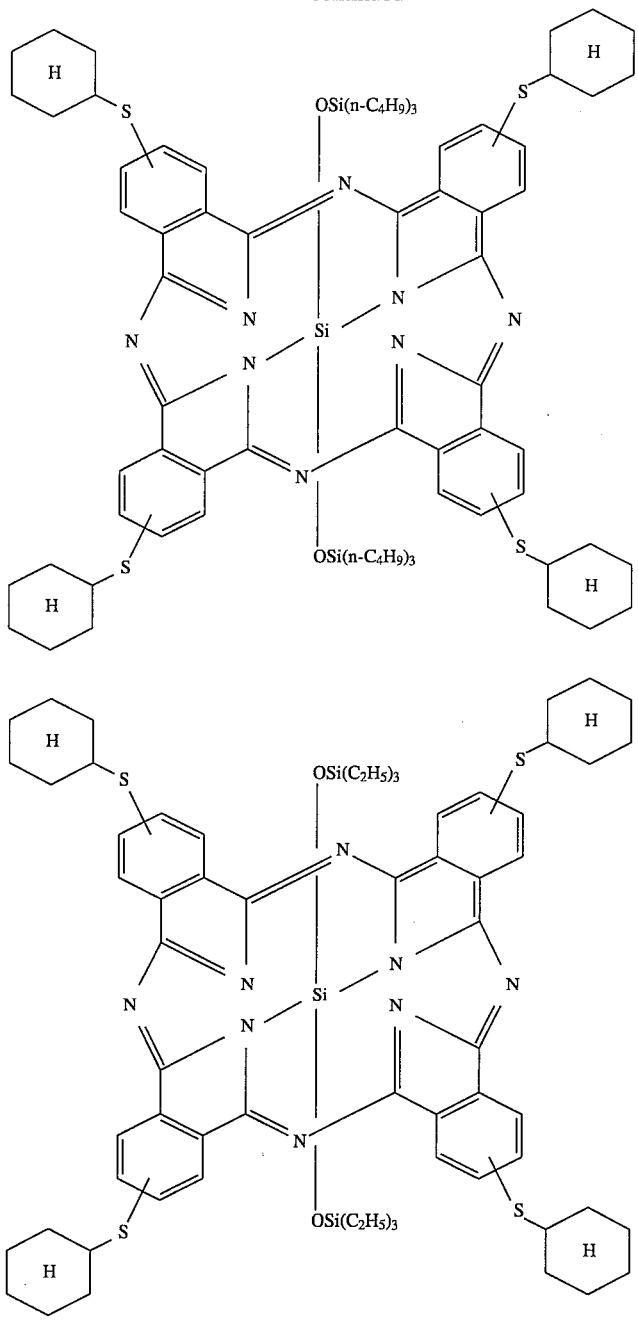

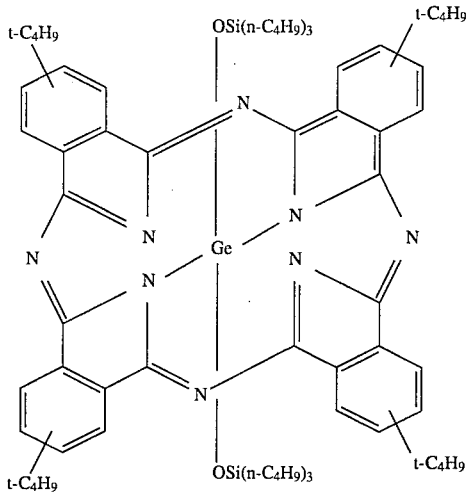

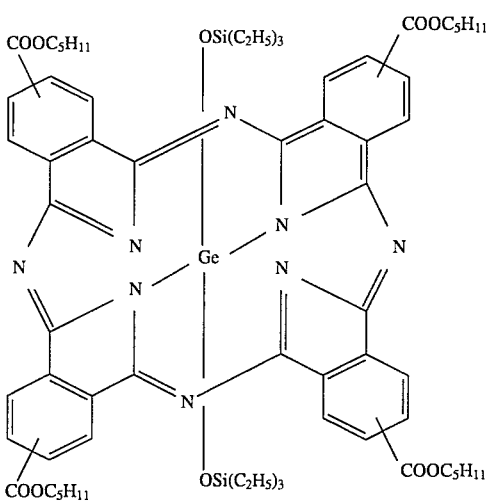

Bis(tributylsiloxy)germanium-tetra(octyloxycarbonyl)naphthalocyanine P. B. T. 203° C.
Bis(tributylsiloxy)silicon-tetra(cyclohexylthio)naphthalocyanine P. B. T. 298° C.
Bis(tripropylsiloxy)silicon-tetra(cyclohexylthio)naphthalocyanine P. B. T. 290° C.
Bis(tributylsiloxy)silicon-tetra(n-butylthio)naphthalocyanine P. B. T. 243° C.
Bis(triethylsiloxy)germanium-tetra(t-butyl)phthalocyanine P. B. T. 272° C.
Bis(tributylsiloxy)germanium-tetra(t-butyl)phthalocyanine P. B. T. 253° C.
Bis(triphenylsiloxy)silicon-phthalocyanine P. B. T. 292° C.
Bis(phenoxy)silicon-phthalocyanine P. B. T. 281° C.

The content of the azaphthalocyanine derivatives, phthalocyanine derivatives and naphthalocyanine derivatives in the information recording layer is a sufficient amount for making the reflectance of the information recording layer 20% or more.

In order to improve the durability, the present inventors have found that the following thermal quenchers (a) to (e) are effective for relaxing damages caused by the laser beam on the recording layer formed by using an azaphthalocyanine, a phthalocyanine or a naphthalocyanine of the formula (I) alone:

(a) Crystalline dyes having a pyrolysis beginning temperature of 350° C. or higher.

(b) Thermal quenchers having a thermal deterioration preventing effect for azaphthalocyanine, phthalocyanine and naphthalocyanine derivatives of the formula (I).

(c) Dyes having a relaxation process for molecular excited state of azaphthalocyanine, phthalocyanine and naphthalocyanine derivatives of the formula (I).

(d) Dyes having a large heat capacity.

(e) Dyes having a large heat conductivity.

By the co-use of a azaphthalocyanine, a phthalocyanine or a naphthalocyanine of the formula (I) and a thermal quencher of (a) to (e) mentioned above, continuous playback (readout) ability of $10^5$ times or more can be attained at the playback laser power of 0.5 to 1.5 mW.

The thermal quencher can also relax a molecular excited state of the azaphthalocyamine derivatives, phthalocyanine derivatives and naphthalocyanine derivatives.

The thermal quencher having a pyrolysis beginning temperature of 350° C. or higher and a function for preventing thermal deterioration is a crystalline dye represented by the formula:

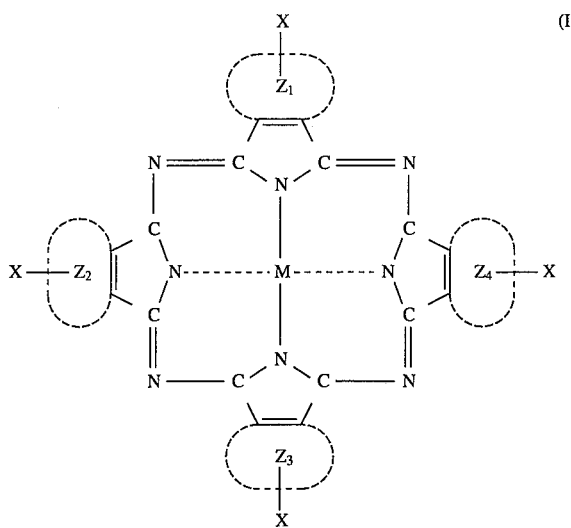
wherein M is a transition metal; and $Z_1$, $Z_2$, $Z_3$, $Z_4$ and X are as defined above.
Preferable examples of the compound of the formula (II) are as follows.
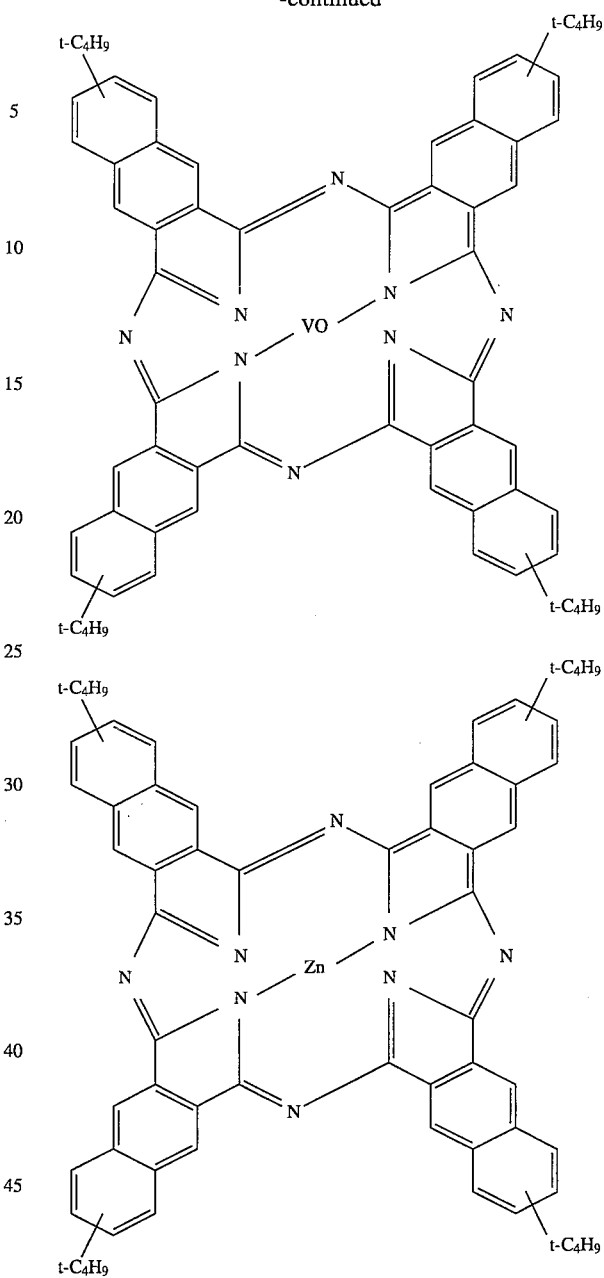
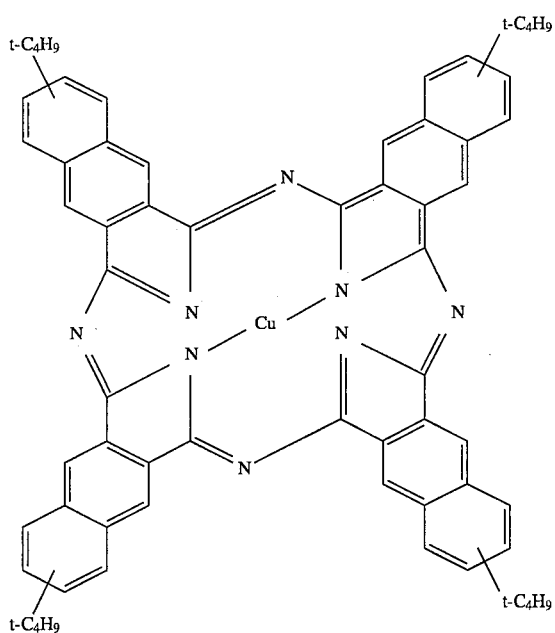
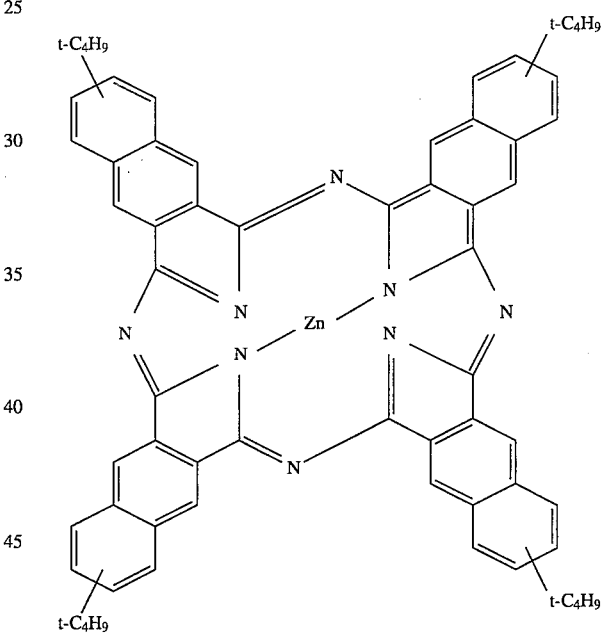

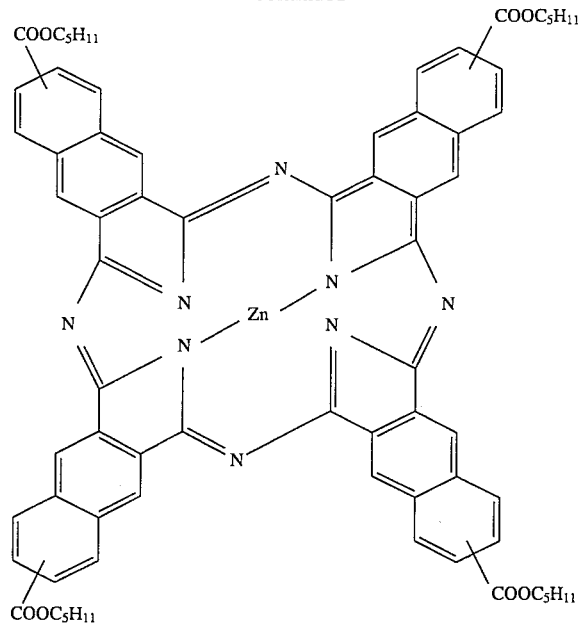
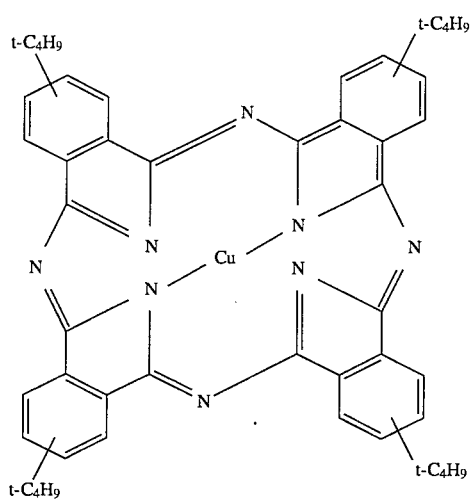
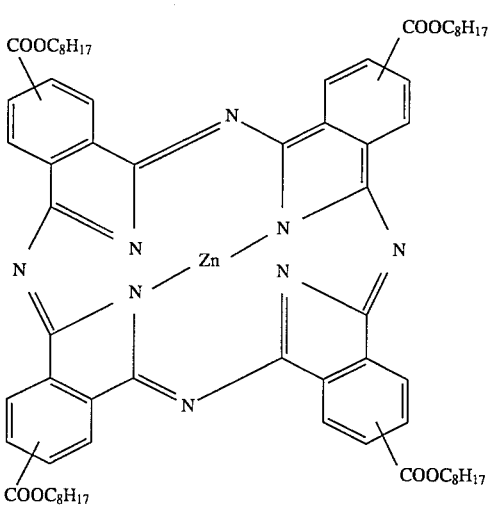
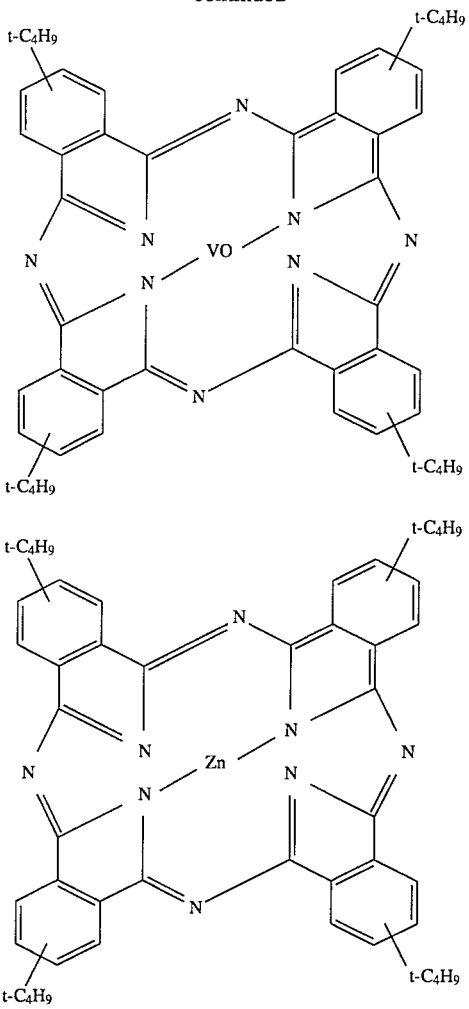

Vanadly tetra-t-butylnaphthalocyanine P. B. T. 372° C.
Copper tetra-t-butylnaphthalocyanine P. B. T. 364° C.
Zinc tetra-t-butylnaphthalocyanine P. B. T. 380° C.
Palladium tetra-t-butylnaphthalocyanine P. B. T. 365° C.
Palladium tetra-t-butylphthalocyanine P. B. T. 370° C.
Copper tetra-t-butylphthalocyanine P. B. T. 386° C.
Zinc tetra-t-butylphthalocyanine P. B. T. 369° C.

In order to show excellent readout light stability (durability), reflectance and solubility in a solvent, the following combinations, for example, are preferable:

A combination of

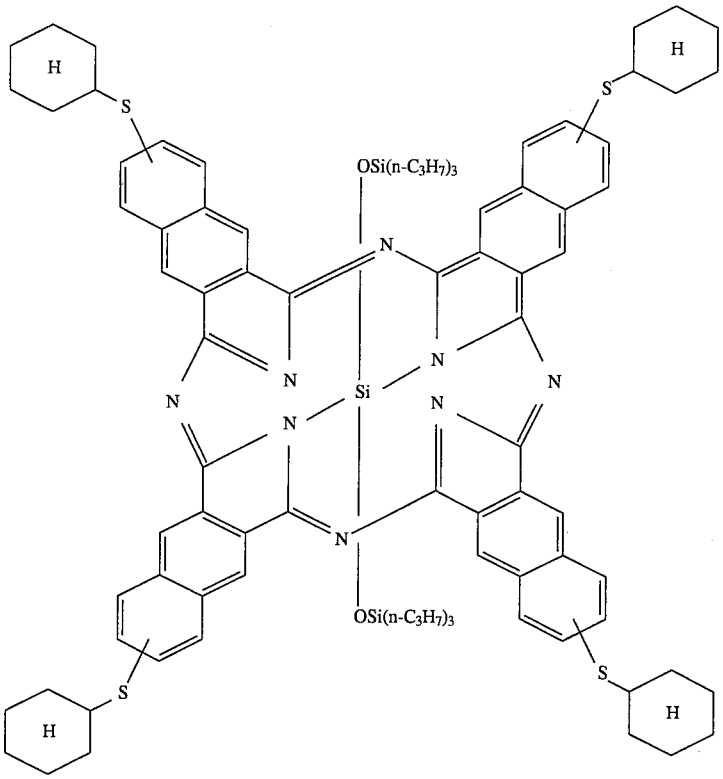

and

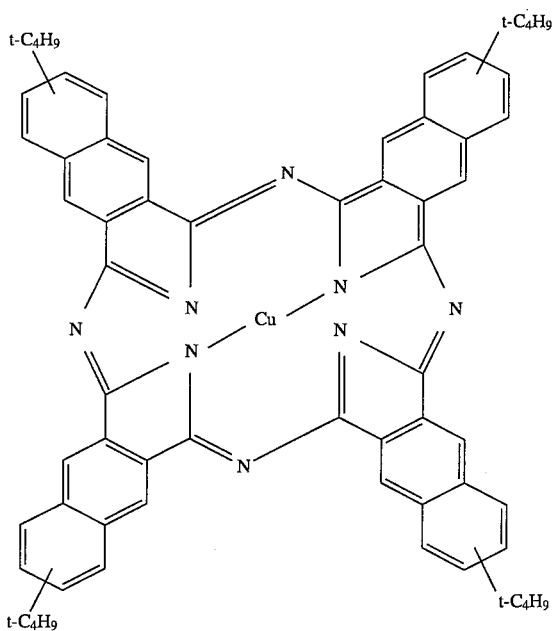

A combination of bis(tributylsiloxy)germaniumtetra(octyloxycarbonyl)naphthalocyanine and copper tetra-t-butylnaphthalocyanine.

A combination of bis(triethylsiloxy)germaniumtetra(octyloxycarbonyl)naphthalocyanine and copper tetra-t-butylnaphthalocyanine.

A combination of bis(tributyloxy)silicon-tetra(cyclohexylthio)naphthalocyanine and zinc t-butylnaphthalocyanine.

A combination of bis(tripropyloxy)silicontetra(cyclohexylthio)naphthalocyanine and vanadyl tetra-t-butylnaphthalocyanine.

A combination of bis(tripropyloxy)silicon-tetra(cyclohexylthio)naphthalocyanine and lead tetra-t-butylnaphthalocyanine.

A combination of bis(tributylsiloxy)silicon-tetra(n-butylthio)naphthalocyanine and palladium tetra-t-butylnaphthalocyanine.

A combination of bis(tributylsiloxy)germanium-tetra(t-butyl)phthalocyanine and palladium tetra-t-butylphthalocyanine.

A combination of bis(triethylsiloxy)germanium-tetra(t-butyl)phthalocyanine and copper tetra-t-butylphthalocynine.

A combination of bis(triethylsiloxy)germanium-tetra(t-butyl)phthalocyanine and zinc tetra-t-butyl-phthalocyanine.

By the combination of two or more organic dyes having different chemical structures, preferably by the combination of (i) an organic dye having a pyrelysis beginning temperature of 300° C. or lower and selected from derivatives of azaphthalocyanine, phthalocyanine and naphthalocyanine of the formula (I) and (ii) a thermal quencher having a pyrolysis beginning temperature of 350° C. or higher, the readout of $10^5$ times or more can be attained at the playback readout power of 0.5 to 1.5 mW.

The organic dye having a pyrolysis beginning temperature of 300° C. or lower and selected from derivatives of azaphthalocyanine, phthalocyanine and naphthalocyanine of the formula (I) and the thermal quencher having a pyrolysis beginning temperature of 350° C. or higher are preferably mixed in the range of weight ratio of the former to the latter 1/0.01 to 1/1.5. Further, the mixing ratio so as to make the reflectance of the information recording layer 20% or more is preferable.

As the material for forming the substrate, there can be used thermoplastic resins and thermosetting resins such as polyvinyl chloride resins, acrylic resins, polyolefin resins, polycarbonate resins, polyvinyl acetal resins, unsaturated polyester resins, vinyl ester resins, polystyrene resins, polyether sulfone resins, polyether ether ketone resins, epoxy resins, allyl resins, polyimides, polyamide resins, etc.; inorganic polymers such as silicone resins, phosphazene resins, etc.; glass, $SiO_2$, $Si_3N_4$, metals, etc. These material are formed into films, sheets, cylinders, prisms of trigonal or more, etc.

Since the substrate is subjected to repeated writing and readout of signals, it is preferable that the substrate has light transmittance of 85% or more and a small optical anisotropy. Depending on a material used, there can take a structure obtained by laminating a photocurable resin on a mirror-like surface of the substrate or on a substrate surface having a guiding groove pattern (pregroove) and transcribing the guiding groove pattern on the surface of the photocurable resin layer.

The film thickness of the information recording layer formed on the substrate is preferably in the range of 20 to 500 nm. But in the case of an optical information recording medium containing a compound which slightly shifts an absorption wavelength of the information recording layer against a laser wavelength, an interference effect of reflectance depending on the film thickness is large. Thus, it is preferable to use a film thickness region which makes the reflectance large. It is preferable to use a first interference film thickness of 30 to 80 nm wherein the reflectance is large and the absorption is small.

The optical information recording medium in the form of sheet or disc of the present invention may further contain a reflective layer, a protective layer, etc., conventionally used. FIG. 10 is a cross-sectional view showing one example of the optical information recording medium of the present invention wherein numeral 1 denotes an information recording layer or film, numeral 2 denotes a substrate, numeral 3 denotes a spacer, numeral 4 is an air gap, numeral 5 is a protective film, add numeral 6 is a central hole.

The thus constructed optical information recording medium is exposed to a laser beam to record information by forming pits on the exposed portions by melting or sublimation. At the time of readout (or playback), the laser beam power is controlled to a predetermined weak level so as not to give damages on the recording layer. Thus, there takes place no thermal deformation of the pit form even if exposed to playback light $10^5$ times or more.

As the laser beam, there can be used various laser beams of $N_2$, He—Ne, Ar, dye, semiconductor, etc., depending on the absorption wavelength of the information recording layer.

For example, in the case of forming the information recording layer with a naphthalocyanine mixture of the formula (I) and (II), a semiconductor laser of 780 to 830 nm can be used for recording and readout. In the case of forming the information recording layer with an azaphthalocyanine, a phthalocyanine, a naphthalocyanine or a mixture thereof, a semiconductor laser of 670 to 710 nm can be used for recording and readout. In these cases, the playback light can be used at 0.5 to 1.5 mW. Further, in the case of using an azaphthalocyanine a naphthalocyanine or a mixture thereof, it is preferable to control the mixing ratio so as to make the reflectance of the information recording layer from the substrate side 20% or more.

The optical information recording medium can contain in the information recording layer a compound which can shift the maximum absorption wavelength of the information recording layer against a laser wavelength used to a shorter wavelength side by 20 to 100 nm. Further the light absorption rate of the information recording layer can preferably be in the range of 1 to 20% of the laser beam used. The recording medium can record and read out signals by the information recording layer without further forming a reflective layer. In addition, the information recording layer has a thickness in the range of making the reflectance larger by applying an interference effect of light.

The optical information recording medium can be produced, for example, as follows.

One process comprises dissolving an organic dye having a pyrolysis beginning temperature of 300° C. or less and selected from derivatives of azaphthalocyanine, phthalocyanine and naphthalocyanine, and a thermal quencher having a pyrolysis beginning temperature of 350° C. or higher in an organic solvent to give a solution of 0.1 to 5% by weight, dipping a substrate in the solution, picking up the substrate, and removing the solvent to produce the desired optical information recording medium.

Another process comprises dissolving an organic dye having a pyrolysis beginning temperature of 300° C. or less, and selected from derivatives of azaphthalocyanine, phthalocyanine and naphthalocyanine, and a thermal quencher having a pyrolysis beginning temperature of 350° C. or higher in an organic solvent to give a solution of 0.1 to 5% by weight, flowing the solution on a substrate revolving at 1000 to 5000 r.p.m. to form a film, and removing the solvent to form a recording layer of 10 to 200 nm thick on the substrate to produce the desired optical information recording medium.

More concretely, two or more organic dyes for forming the information recording layer are coated on the substrate using a spin coating, spray coating or dip coating apparatus conventionally used to form a thin film. For example, an azaphthalocyanine, a phthalocyanine or a naphthalocyanine of the formula (I) together with a thermal quencher is dissolved in an organic solvent or dispersed in an solvent, if necessary, together with a binder, followed by coating on the substrate.

As the binder, there can be used polymers such as polyimides, polyamides, polystyrenes, acrylic resins, silicone resins, epoxy resins, phenolic resins, etc.

As the organic solvent, there can be used aromatic compounds such as benzene, xylene, toluene, etc.; ketones such as methyl ethyl ketone, etc.; ethers; halogenated compounds such as chloroform, carbon tetrachloride, etc.; saturated hydrocarbons or a mixture thereof. Among them, the use of carbon tetrachloride and a mixture of methylcyclohexane and toluene is preferable.

When an optical information recording media using an azaphthalocyanine, a phthalocyanine or a naphthalocyanine of the formula (I) alone as a recording layer is exposed to a playback laser beam power of 1 mW, the number of playback readout is in the order of $10^3$ to $10^4$, which value is by far poor compared with the order of $10^6$ in the case of using inorganic recording media.

The present inventors found that the pyrolysis beginning temperatures of the azaphthalocyanines, phthalocyanines and naphthalocyanines of the formula (I) are 300° C. or lower. On the other hand, when a semiconductor laser beam of 1 mW or more is irradiated on a recording film, the irradiated surface of the film formed with an azaphthalocyanine, a phthalocyanine, or a naphthalocyanine of the formula (I) alone becomes 300° C. or higher. Therefore, the recording layer obtained by using an azaphthalocyane, a phthalocyanine or a naphthalocyanine of the formula (i) alone cannot bear against the laser beam of 1 mW or more (wavelength 830 nm), which seem to result in lowering the durability (readout light stability).

The present invention further provides a playback apparatus suitable for the optical information recording medium mentioned above.

Figure 4:
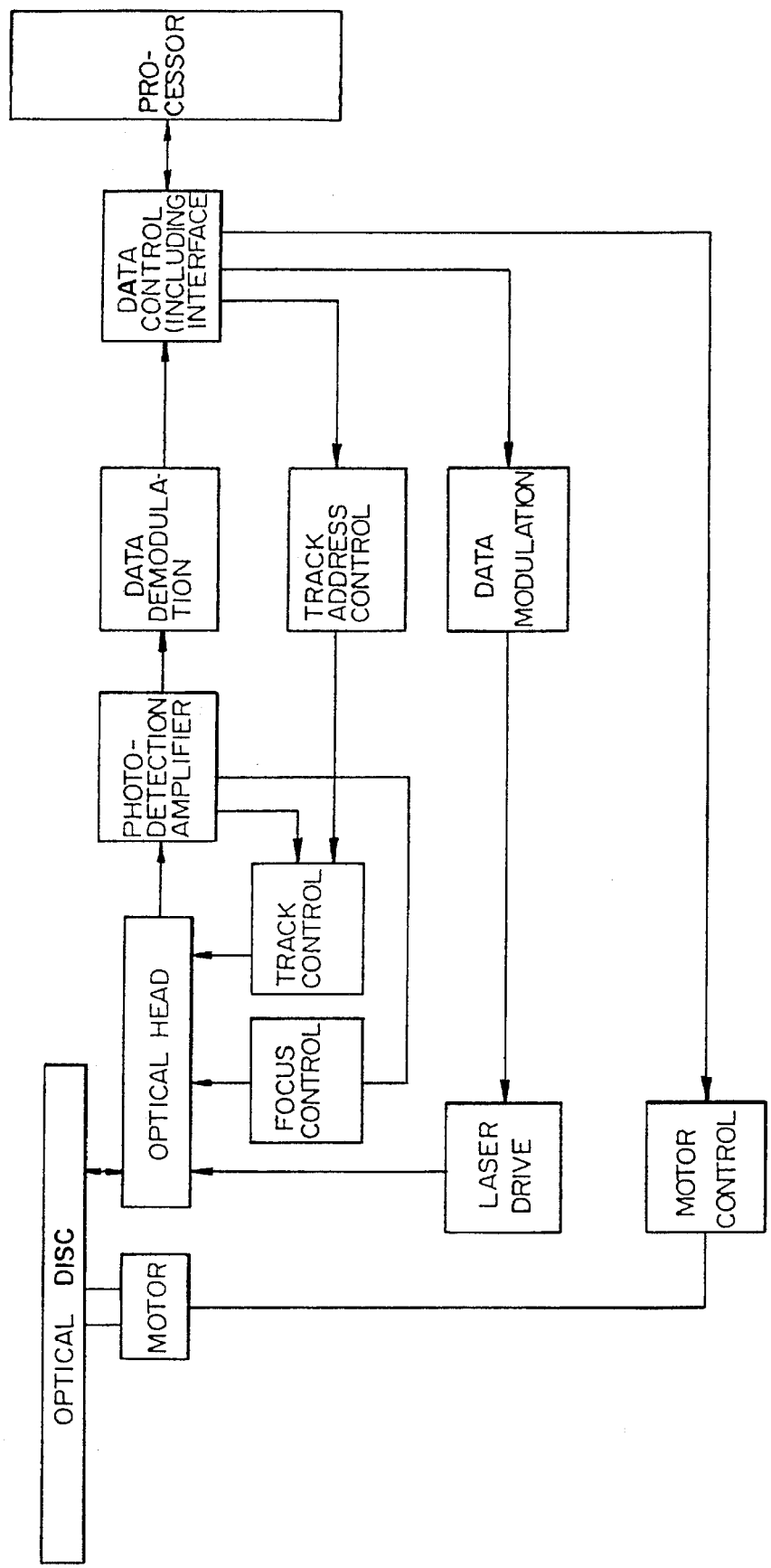
FIG. 4 is a schematic view showing an optical system of a recording and playback apparatus.

The playback apparatus comprises an optical information recording medium, an optical head equipped with a laser beam generator capable of reading out information from the optical information recording medium, a revolving means for revolving the optical information recording medium, a drive circuit for control the action of the optical head and the number of revolutions of the revolving means, a processor for instructing the drive circuit, an input means for inputting information into the processor, and an output means for outputting information from the processor, said optical information recording medium comprising a substrate and an information recording layer formed on the substrate, said information recording layer comprising at least two organic dyes having different chemical structures and continuous playback ability of $10^5$ times or more at a playback laser power of 0.5 to 1.5 mW. This apparatus is shown in FIG. 4.

In such a playback apparatus, it is preferable that the laser beam generator emits a laser beam having a wavelength of 640 to 720 nm or 780 to 830 nm.

The present invention still further provides a process for read out information from an optical information recording medium, which comprises irradiating a laser beam on an information recording layer of an optical information recording medium, and reading out the information recorded on the optical information recording medium by applying optical modulation of reflected light or transmitted light, said optical information recording medium comprising a substrate and an information recording layer formed on the substrate, said information recording layer comprising at least two organic dyes having different chemical structures and continuous playback ability of $10^5$ times or more at a playback laser power of 0.5 to 1.5 mW.

The present invention is illustrated by way of the following Examples, in which all percents are by weight unless otherwise specified.

EXAMPLE 1

On a polycarbonate substrate of 1.2 mm thick, a 0.5% solution obtained by dissolving bis(tributyl-siloxy)germanium-tetra(octyloxycarbonyl)naphthalocyanine and copper tetra-t-butylnaphthalocyanine in a weight ratio of 1:0.8 in carbon tetrachloride was spin coated to form a recording layer of 45 nm thick. The reflectance of the recording layer of the resulting recording medium from the substrate side at the wavelength of 830 nm was 28%.

Further, on the recording medium, output light of laser diode of 830 nm in wavelength was focused in a spot diameter of 1.2 μm, and a signal of recording frequency of 1 MHz was written from the substrate side at a linear speed of 8.0 m/s and output of 9 mW. Then, readout was conducted with playback light of 1.0 mW to give a playback carrier-to-noise (C/N) ratio of 46 dB.

Further, the number of readout by irradiating playback light of 1.0 mW continuously was shown in FIG. 1.

EXAMPLE 2

On a polycarbonate substrate of 1.2 m thick, 0.5% solution obtained by dissolving bis(triethylsiloxy)germanium-tetra(octyloxycarbonyl)naphthalocyanine and copper tetra-t-butylnaphthalocyanine in a weight ratio of 1:0.75 in carbon tetrachloride was spin coated to form a recording layer of 43 nm thick. The reflectance of the recording layer of the resulting recording medium from the substrate side was 32%.

Further, on the recording medium, output light of laser diode of 830 nm in wavelength was focused in a spot diameter of 1.2 μm, and a signal of recording frequency of 1 MHz was written from the substrate side at a linear speed of 8.0 m/s and output of 9 mW. Then, readout was conducted with playback light of 1.0 mW to give a playback C/N ratio of 50 dB.

Figure 2:
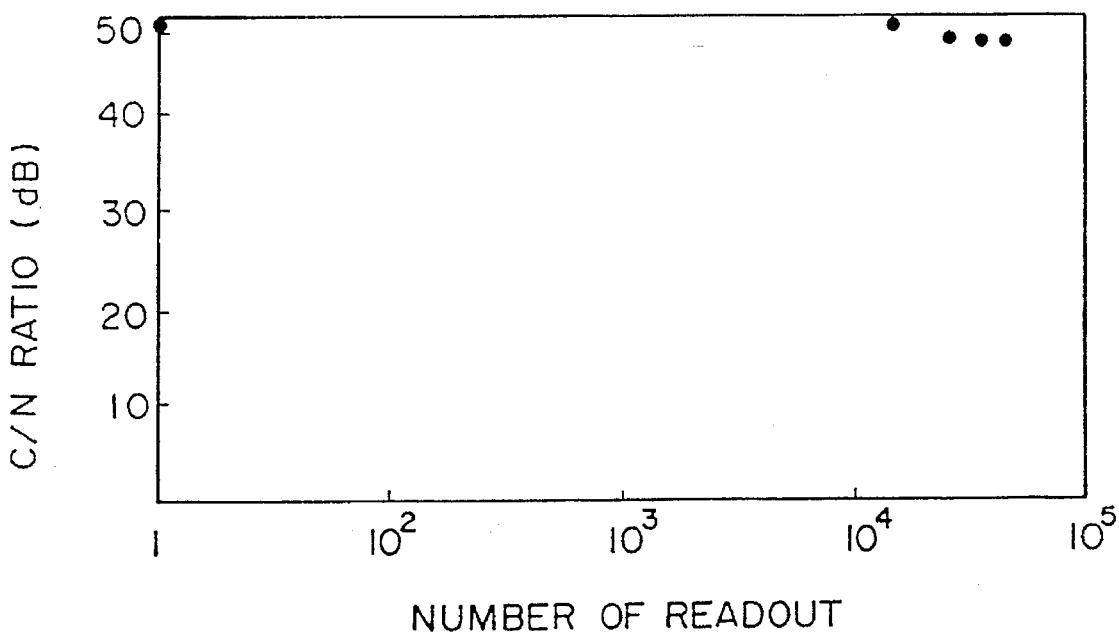
FIG. 2 is a graph showing readout light stability when bis(triethylsiloxy)germanium-tetra(octyloxy)naphthalocyanine and copper tetra-b-tuylnaphthalocyanine (4:3 in weight ratio) are used as organic dyes.

Further, the number of readout by irradiating playback light of 1.0 mW continuously was shown in FIG. 2.

Comparative Example 1

On a polycarbonate substrate of 1.2 mm thick, 1.0% solution obtained by dissolving bis(tributylsiloxy)-germanium-tetra(octyloxycarbonyl)naphthalocyanine in carbon tetrachloride was spin coated to form a recording layer of 53 nm. The reflectance of the recording layer of the resulting recording medium from the substrate side at the wavelength of 830 nm was 38%.

Further on the recording medium, output light of laser diode of 830 nm in wavelength was focused in a spot diameter of 1.2 μm, and a signal of recording frequency of 1 MHz was written from the substrate side at a linear speed of 8.0 m/s and output of 9 mW. Then, readout was conducted with playback light of 1.0 mW to give a playback C/N ratio of 42 dB.

Figure 3:
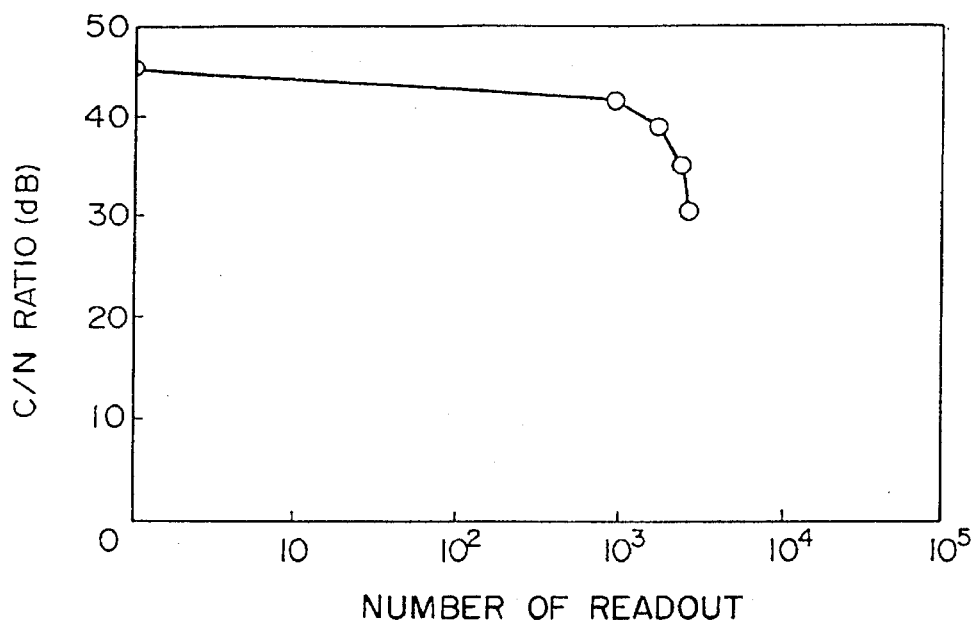
FIG. 3 is a graph showing readout light stability when bis(tributylsiloxy)germanium-tetra(octyloxycarbonyl)naphthalocyanine alone is used as an organic dye.

Further, the readout light stability by changing the power of playback light was shown in FIG. 3. In this case, the recording medium was deteriorated at the playback light of 1.0 mW.

EXAMPLE 3

On a polycarbonate substrate of 1.2 mm thick, a 1.0% solution obtained by dissolving bis(tributyloxy)-silicon-tetra(cyclohexylthio)naphthalocyanine and zinc tetra-t-butylnaphthalocyanine in a weight ratio of 1:0.8 in carbon tetrachloride was spin coated to form a recording layer of 55 nm thick. The reflectance of the recording layer of the resulting recording medium from the substrate side at the wavelength of 830 nm was 37%.

Further, on the recording medium, output light of laser diode of 830 nm in wavelength was focused in a spot diameter of 1.2 µm, and a signal of recording frequency of 1 MHz was written from the substrate side at a linear speed of 8.0 m/s and output of 9 mW. Then, readout was conducted with playback light of 1.0 mW to give a playback C/N ratio of 49 dB.

Further, the number of readout by irradiating playback light of 1.0 mW continuously was $10^5$ times or more.

EXAMPLE 4

On a polycarbonate substrate of 1.2 mm thick, a 0.8% solution obtained by dissolving bis(tripropyl-siloxy)silicon-tetra(cyclohexylthio)naphthalocyanine and vanadyl tetra-t-butylnaphthalocyanine in a weight ratio of 1:0.8 in carbon tetrachloride was spin coated to form a recording layer of 49 nm thick. The reflectance of the recording layer of the resulting recording medium from the substrate side at the wavelength of 830 nm was 35%.

Further, on the recording medium, output light of laser diode of 830 nm in wavelength was focused in a spot diameter of 1.2 µm, and a signal of recording frequency of 1 MHz was written from the substrate side at a linear speed of 8.0 m/s and output of 9 mW. Then, readout was conducted with playback light of 1.0 mW to give a playback C/N ratio of 51 dB.

Further, the number of readout by irradiating playback light of 1.0 mW continuously was $10^5$ times or more.

EXAMPLE 5

On a polycarbonate substrate of 1.2 mm thick, a 1.0% solution obtained by dissolving bis(tripropylsiloxy)silicon-tetra(cyclohexylthio)naphthalocyanine and zinc tetra-t-butylanphthalocyanine in a weight ratio as shown in Table 1 in carbon tetrachloride was spin coated to form a recording layer having a thickness as shown in Table 1.

The reflectance of the recording layer was also examined as described in Example 1 and shown in Table 1.

The playback C/N ratio and the number of readout by irradiating playback light of 1.0 mW continuously were also examined in the same manner as described in Example 4 and shown in Table 1.

TABLE 1

| Mixing ratio | Film thickness (nm) | Reflectance (%) | Playback C/N ratio (dB) | Number of readout (playback light: 1 mW) |
|---|---|---|---|---|
| 1.0:0.1 | 42 | 37.0 | 51 | >$10^6$ |
| 1.0:0.2 | 43 | 36.0 | 49 | >$10^6$ |
| 1.0:0.3 | 46 | 34.8 | 48 | >$10^6$ |
| 1.0:0.4 | 53 | 33.2 | 46 | >$10^6$ |
| 1.0:0.5 | 49 | 31.7 | 46 | >$10^6$ |
| 1.0:0.8 | 54 | 29.4 | 43 | >$10^6$ |
| 1.0:1.0 | 51 | 27.5 | 43 | >$10^6$ |
| 1.0:1.2 | 49 | 24.2 | 46 | >$10^6$ |
| 1.0:1.5 | 53 | 21.9 | 46 | >$10^6$ |

As is clear from Table 1, good playback C/N ratios and readout light stability are obtained in individual mixing ratios.

But when the mixing ratio was more than 1:1.5, the reflectance became 20% or less, resulting in failing to detect the playback C/N ratio and readout light stability.

EXAMPLE 6

On a polycarbonate substrate of 1.2 mm thick, a 1.2% solution obtained by dissolving bis(tributylsiloxy)silicon-tetra(n-butylthio)naphthalocyanine and vanadium tetra-t-butylnaphthalocyanine in a weight ratio of 1:0.8 in carbon tetrachloride was spin coated to form a recording layer of 52 nm thick. The reflectance of the recording layer of the resulting recording medium from the substrate side at the wavelength of 830 nm was 33%.

Further, on the recording medium, output light of laser diode of 830 nm in wavelength was focused in a spot diameter of 1.2 µm, and a signal of recording frequency of 1 MHz was written from the substrate side at a linear speed of 8.0 m/s and output of 9 mW. Then, readout was conducted with playback light of 1.0 mW to give a playback C/N ratio of 46 dB.

Further, the number of readout by irradiating playback light of 1.0 mW continuously was $10^5$ times or more.

EXAMPLE 7

On a polycarbonate substrate of 1.2 mm thick, a 0.8% solution obtained by dissolving bis(tributyl-siloxy)germanium-tetra(t-butyl)phthalocyanine and palladium tetra-t-butylphthalocyanine in a weight ratio of 1:0.8 in carbon tetrachloride was spin coated to form a recording layer of 46 nm thick. The reflectance of the recording layer of the resulting recording medium from the substrate side at the wavelength of 690 nm was 31%.

Further, on the recording medium, output light of laser diode of 690 nm in wavelength was focused in a spot diameter of 1.2 µm, and a signal of recording frequency of 1 MHz was written from the substrate side at a linear speed of 8.0 m/s and output of 6 mW. Then, readout was conducted with playback light of 1.0 mW to give a playback C/N ratio of 43 dB.

Further, the number of readout by irradiating playback light of 1.0 mW continuously was $10^5$ times or more.

EXAMPLE 8

On a polycarbonate substrate of 1.2 mm thick, a 1.0% solution obtained by dissolving bis(triethyl-siloxy)germanium-tetra(t-butyl)phthalocyanine and copper tetra-t-butylphthalocyanine in a weight ratio of 1:0.8 in carbon tetrachloride was spin coated to form a recording layer of 45 nm thick. The reflectance of the recording layer of the resulting recording medium from the substrate side at the wavelength of 690 nm was 29%.

Further, on the recording medium, output light of laser diode of 690 nm in wavelength was focused in a spot diameter of 1.2 µm, and a signal of recording frequency of 1 MHz was written from the substrate side at a linear speed of 8.0 m/s and output of 6 mW. Then, readout was conducted with playback light of 1.0 mW to give a playback C/N ratio of 44 dB.

Further, the number of readout by irradiating playback light of 1.0 mW continuously was $10^5$ times or more.

EXAMPLE 9

On a polycarbonate substrate of 1.2 mm thick, a 1.0% solution obtained by dissolving bis(triethylsiloxy)germanium-tetra(t-butyl)phthalocyanine and zinc tetra-t-butylphthalocyanine in a weight ratio as shown in Table 2 in carbon tetrachloride was spin coated to form a recording layer having a thickness as shown in Table 2.

The reflectance of the recording layer was also examined as described in Example 8 and shown in Table 2.

The playback C/N ratio and the number of readout by irradiating playback light of 1.0 mW continuously were also examined in the same manner as described in Example 8 and shown in Table 2.

TABLE 2

| Mixing ratio | Film thickness (nm) | Reflectance (%) | Playback C/N ratio (dB) | Number of readout (playback light: 1 mW) |
|---|---|---|---|---|
| 1.0:0.1 | 46 | 36.1 | 53 | >$10^6$ |
| 1.0:0.2 | 45 | 35.4 | 51 | >$10^6$ |
| 1.0:0.3 | 47 | 35.1 | 50 | >$10^6$ |
| 1.0:0.4 | 49 | 34.7 | 50 | >$10^6$ |
| 1.0:0.5 | 47 | 34.6 | 49 | >$10^6$ |
| 1.0:0.8 | 51 | 31.4 | 46 | >$10^6$ |
| 1.0:1.0 | 48 | 28.1 | 45 | >$10^6$ |
| 1.0:1.2 | 47 | 25.2 | 45 | >$10^6$ |
| 1.0:1.5 | 47 | 22.1 | 44 | >$10^6$ |

As is clear from Table 2, good playback C/N ratio and radout light stability are obtained in individual mixing ratios.

But when the mixing ratio was more than 1:1.5, the reflectance became 20% or less, resulting in failing to detect the playback C/N ratio and readout light stability.

EXAMPLE 10

Figure 5:
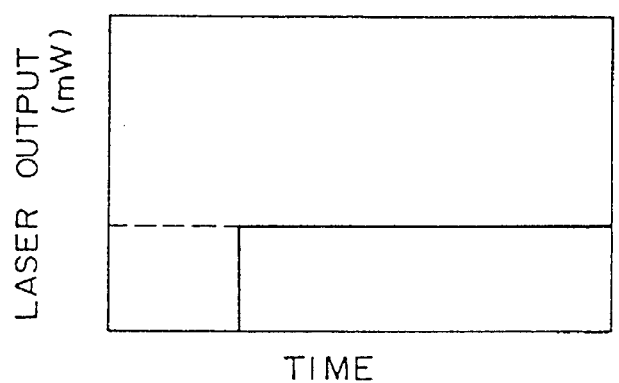
FIG. 5 shows a laser output wave-form of readout light.

Using a recording playback apparatus as shown in FIG. 4, the readout light stability of the recording medium obtained in Example 1 was evaluated, while applying the laser output of readout light as shown in FIG. 5. As a result, the number of readout when continuously irradiated by playback light of 1.0 mW was $10^5$ times or more.

EXAMPLE 11

Figure 6:
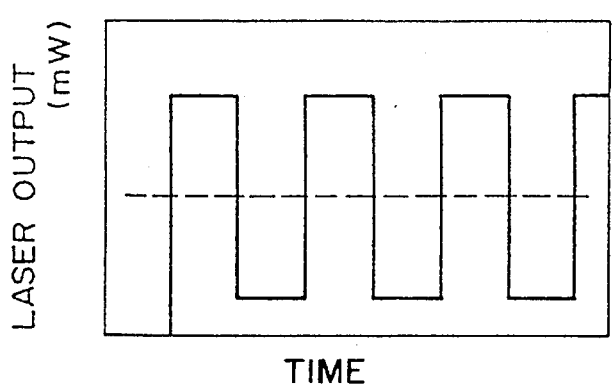
FIG. 6 shows a laser output wave-form of readout light.

Using the same optical system as used in Example 10, the readout light stability of the recording medium obtained in Example 1 was evaluated, while applying the laser output of readout light as shown in FIG. 6. As a result, the number of readout when continuously irradiated by playback light of 10 mW was $10^5$ times or more.

EXAMPLE 12

A recording medium was produced by vacuum depositing bis(triphenylsiloxy)silicon-phthalocyanine at the degree of vacuum of $6.7 \times 10^{-6}$ torr on a polycarbonate substrate of 130 mm in diameter and 1.2 mm in thickness with guiding grooves, the temperature of the substrate being not particularly controlled but allowed to stand, to give a recording layer of 80 nm thick.

Figure 7:
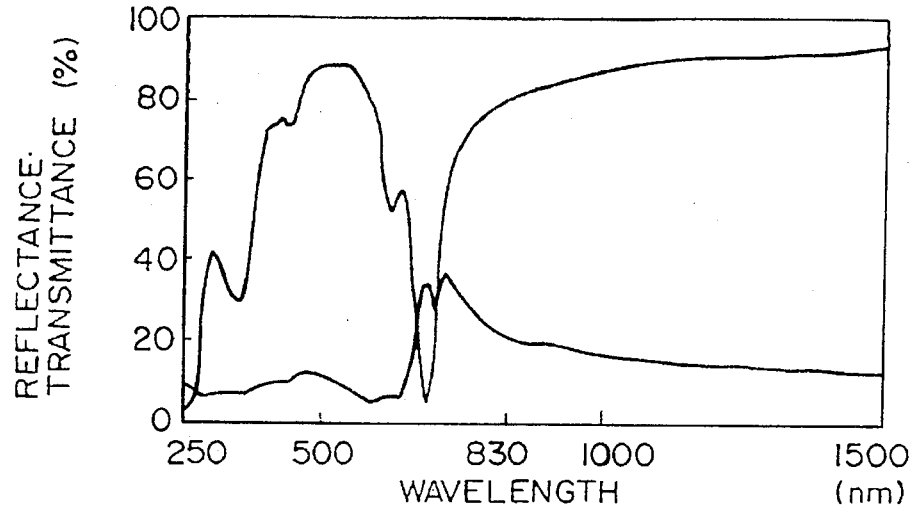
FIG. 7 is transmittance and reflectance spectra of a bis(triphenylsiloxy)silicon-phthalocyanine thin film.

Spectroscopic properties (reflectance and transmittance) of the resulting recording layer are shown in FIG. 7. The maximum absorption was 690 nm.

Further, on the recording medium, output light of laser diode of 780 nm in wavelength (difference from maximum absorption: 90 nm) was focused in a spot diameter of 1.2 µm, and a signal of recording frequency of 1 MHz was written from the substrate side at a linear speed of 8.0 m/s and output of 9 mW. The absorption rate at the wavelength of 780 nm was 4.1%. After recording, readout was carried out using playback light of 1.0 mW. The playback C/N ratio was 46 dB. The number of readout at the readout light of 1.0 mW was $10^5$ times or more. This means that the recording medium is excellent in the readout light stability.

Further, when copper tetra-t-butylphthalocyanine was mixed with bis(triphenylsiloxy)silicon-phthalocyanine, the resulting recording medium was improved in the readout light stability compared with the recording medium using the bis(triphenylsiloxy)silicon-phthalocyanine alone.

Comparative Example 2

Using the same recording medium as used in Example 12, output light of laser diode of 830 nm in wavelength (difference from the maximum absorption: 140 nm) was focused in spot diameter of 1.2 µm, and a signal of recording frequency of 1 MHz was written from the substrate side at a linear speed of 8.0 m/s and output of 9 mW. But, since the absorption rate at the wavelength of 830 nm was as small as 0.8%, there was shown no recording sensitivity.

EXAMPLE 13

A recording medium was produced by vacuum depositing bis(phenoxy)silicon-phthalocyanine on a polycarbonate substrate of 130 mm in diameter and 1.2 mm in thickness with guiding grooves in the same manner as described in Example 12 to give a recording layer of 92 nm thick.

Figure 8:
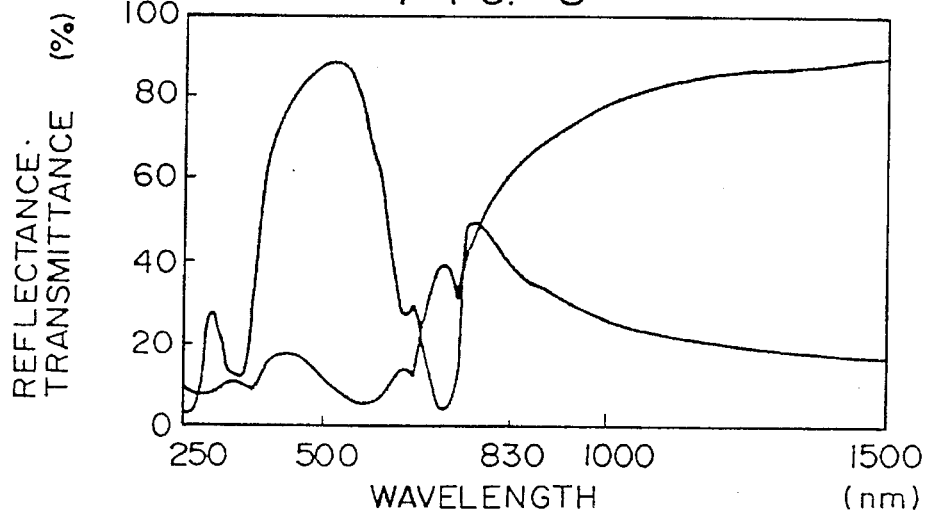
FIG. 8 is transmittance and reflectance spectra of a bis(phenoxy)silicon-phthalocyanine thin film.

Spectroscopic properties of the resulting recording layer are shown in FIG. 8. The maximum absorption was 720 nm.

Then, on the recording medium, output light of laser diode of 780 nm in wavelength (difference from the maximum absorption: 60 nm) was focused in a spot diameter of 1.2 µm, and a signal of recording frequency of 1 MHz was written from the substrate side at a linear speed of 8.0 m/s and output of 9 mW. When readout was carried out using playback light of 1.0 mW, the playback C/N ratio was 50 dB. The number of readout at the readout light of 1.0 mW was $10^5$ times or more. This means that the recording medium is excellent in the readout light stability.

Further, when zinc tetra-t-butylphthalocyanine was mixed with bis(phenoxy)silicon-phthalocyanine, the resulting recording medium was improved in the readout light stability compared with the recording medium using bis(phenoxy) silicon-phthalocyanine alone.

Comparative Example 3

Using the same recording medium as used in Example 12, output light of semiconductor laser of 830 nm in wavelength (difference from the maximum absorption: 110 nm) was focused in spot diameter of 1.2 µm, and a signal of recording frequency of 1 MHz was written from the substrate side at a linear speed of 8.0 m/s and output of 9 mW. But since the absorption rate at the wavelength of 830 nm was as small as 0.8%, there was shown no recording sensitivity.

Comparative Example 4

Vanadyl-tetra(t-butyl)naphthalocyanine was synthesized according to the method disclosed in Zhurnal Obschei Khimii, vol. 42, p. 696 (1972).

Figure 9:
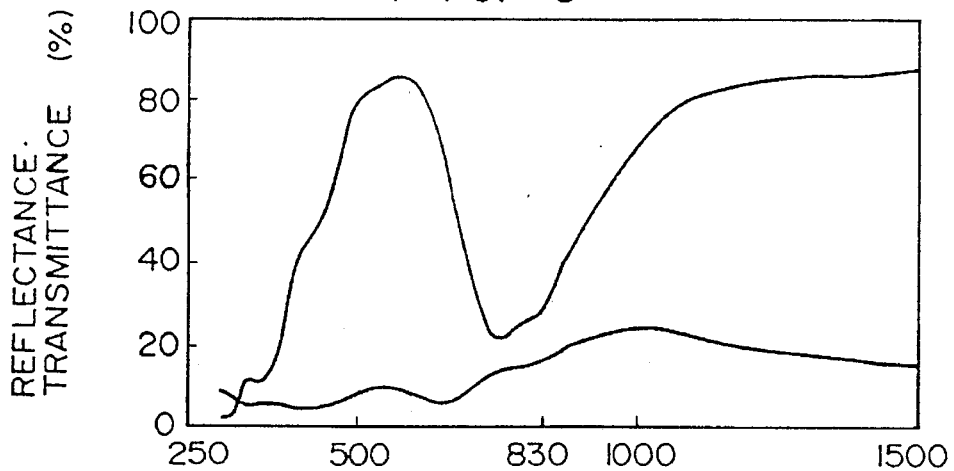
FIG. 9 is transmittance and reflectance spectra of a vanadyl-tetra(t-butyl)naphthalocyanine thin film.

A 1.5% chloroform solution of this compound was prepared and coated on a glass substrate of 1.2 mm thick by spin coating to form a recording layer of 78 nm thick. The spectroscopic properties of the recording layer of the resulting recording medium are shown in FIG. 9.

Recording playback properties using a semiconductor laser of 830 nm in wavelength were tried to evaluate, but the reflectance was too small to measure the focusing and tracking. Thus, the C/N ratio was not able to be measured.

EXAMPLE 14

On a polycarbonate substrate of 1.2 mm thick, a solution obtained by dissolving bis(tributylsiloxy)silicon-tetra(trimethylsilyl)naphthalocyanine and copper tetra-t-butylnaphthalocyanine in a weight ratio of 1:0.8 in carbon tetrachloride was spin coated to form a recording layer of 48 nm thick. The reflectance of the recording layer of the resulting recording medium from the substrate side was 37%.

Further, on the recording medium, output light of laser diode of 830 nm in wavelength was focused in a spot diameter of 1.2 μm, and a signal of recording frequency of 1 MHz was written from the substrate side at a linear speed of 8.0 m/s and output of 9 mW. Then, readout was conducted with playback light of 1.0 mW to give a playback C/N ratio of 51 dB.

Further, the number of readout by irrdiating playback light of 1.0 mW was $10^5$ times or more.

As mentioned above, the optical information recording medium of the present invention can be produced by spin coating or dip coating of a mixture of (i) an azaphthalocyanine, phthalocyanine, or naphthalocyanine derivative and (ii) a thermal quencher on a substrate.

Further, the obtained thin film of recording layer shows excellent readout light stability of $10^5$ times or more at a readout laser power of 0.5 to 1.5 mW. Therefore, the optical information recording medium of the present invention can suitably be used as a write-once optical recording medium.

What is claimed is:

1. A playback apparatus comprising on optical information recording medium, and an optical head equipped with a laser beam generator capable of reading out information from the optical information recording medium, said optical information recording medium comprising a substrate and an information recording layer formed on the substrate, said information recording layer comprising at least two organic dyes having different chemical structures and continuous playback ability of $10^5$ times or more at a playback laser power of 0.5 to 1.5 mW, one of said two organic dyes having a bulky structure wherein large side chains are projected from a central atom and a pyrolysis beginning temperature of 300° C. or less and selected from the group consisting of derivatives of azaphthalocyanine, phthalocyanine and naphthalocyanine, and another of said two organic dyes being a thermal quencher having a flat structure and a pyrolysis beginning temperatures of 350° C. or higher and a function for preventing thermal deterioration.

2. A playback apparatus according to claim 1, wherein the laser beam generator emits a laser beam having a wavelength of 640 to 720 nm or 780 to 830 nm.

3. A playback apparatus according to claim 1, wherein the organic dye having a bulky structure is represented by the formula

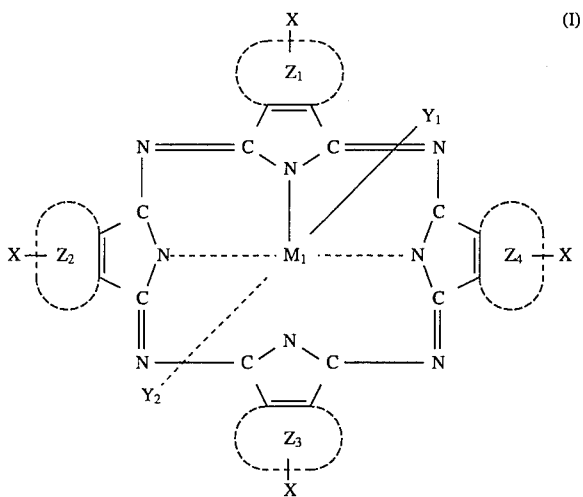

wherein $M_1$ is metallic atom selected from Si, Ge and Sn belonging to the group IV of the periodic table; $Z_1$, $Z_2$, $Z_3$ and $Z_4$ are independently a pyridine ring, a benzene ring or a naphthalene ring non-substituted or having one or more mono-valent substituents -X; X is an alkyl group, and alkenyl group, an alkylthio group, a phenyl group, an acyl group or a tri-substituted silyl group; $Y_1$ and $Y_2$ are independently —Ar, —Or, —OASr, —OSi-(R)$_3$, —OSi-(OR)$_3$ or —OC(C$_6$H$_5$)$_3$; R is a straight- or branched-chain alkyl group; and Ar is a phenyl group, a substituted phenyl group, a benzyl group or a substituted benzyl group.

4. A playback apparatus according to claim 1, wherein the thermal quencher having a flat structure is represented by the formula:

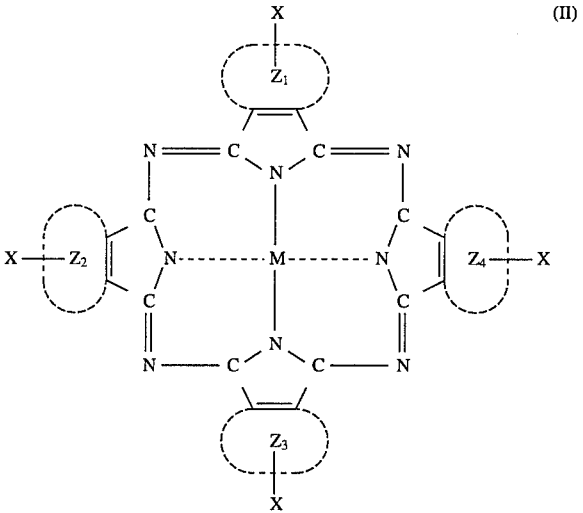

wherein M is a transition metal; $Z_1$, $Z_2$, $Z_3$ and $Z_4$ are independently a pyridine ring, a benzene ring or a naphthalene ring non-substituted or having one more monovalent substituents -X and X is an alkyl group, an alkenyl group, an alkylthio group, a phenyl group, and acyl group or a tri-substituted silyl group.

5. A playback apparatus according to claim 1, wherein the organic dye having a bulky structure is represented by the formula:

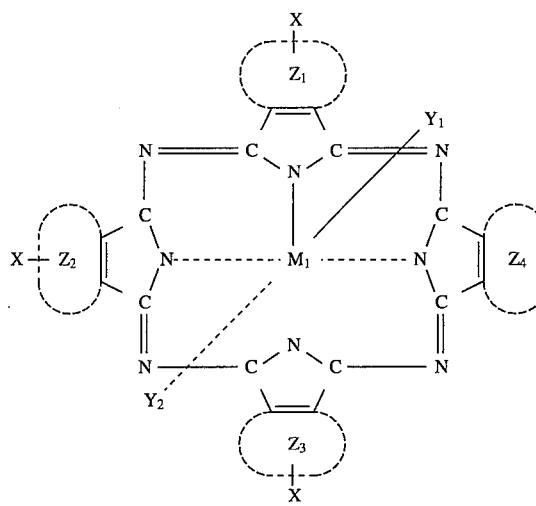

wherein $M_1$ is a metallic atom selected from Si, Ge and Sn belonging to the group IV of the periodic table; $Z_1$, $Z_2$, $Z_3$ and $Z_4$ are independently a pyridine ring, a benzene ring or a naphthalene ring non-substituted or having one or more monovalent substituents -X; X is an alkyl group, an alkenyl group, an alkylthio group, a phenyl group, an acyl group or a tri-substituted silyl group; $Y_1$ and $Y_2$ are independently —Ar, —Or, —OAr, —OSi—$(R_3)$, —OSi—$(OR)_3$, —OSi$(OR)_3$, —OSi$(OAr)_3$ or —OC$(C_6H_5)_3$; R is a straight- or branched-chain alkyl group; and Ar is a phenyl group, a substituted phenyl group, a benzyl group or a substituted benzyl group and the thermal quencher having a flat structure is represented by the formula:

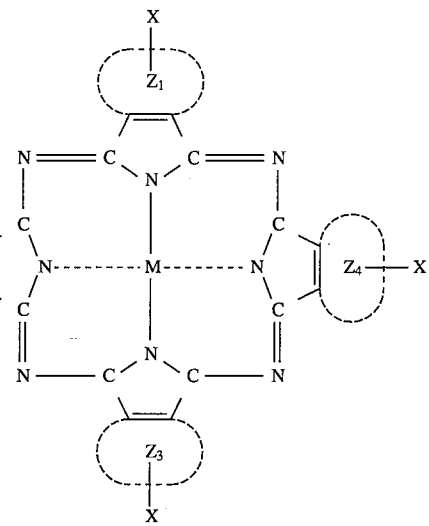

wherein M is a transition metal; and $Z_1$, $Z_2$, $Z_3$ and $Z_4$ and X are defined as above.

6. A playback apparatus according to claim 1, wherein in the formula (I) $M_1$ is Si; $Z_1$, $Z_2$, $Z_3$ and $Z_4$ are independently a naphthalene ring or a benzene ring; X is a tri-substituted silyl group; $Y_1$ and $Y_2$ are independently —OSi—$(R)_3$; and R is a straight- or branched-chain alkyl group; and in the formula (II) M is Cu, Zn or Si; $Z_1$, $Z_2$, $Z_3$ and $Z_4$ are independently a naphthalene ring or a benzene ring; and Z is an alkyl group or a tri-substituted silyl group.

7. A playback apparatus according to claim 1, further comprising a revolving means for revolving the optical information recording medium, a drive circuit for controlling the action of the optical head and the number of revolutions of the revolving means, a processor for instructing the drive circuit, an input means for inputting information into the processor, and an output means for outputting information from the processor.

* * * * *